(12) United States Patent
Chakraborty et al.

(10) Patent No.: US 11,169,518 B2
(45) Date of Patent: *Nov. 9, 2021

(54) TRACKING INDOOR OBJECTS WITH INERTIAL SENSOR MEASUREMENTS

(71) Applicant: NEC Laboratories America, Inc., Princeton, NJ (US)

(72) Inventors: Ayon Chakraborty, Plainsboro, NJ (US); Karthikeyan Sundaresan, Manalapan, NJ (US); Sampath Rangarajan, Bridgewater, NJ (US); Ashutosh Dhekne, Urbana, IL (US)

(73) Assignee: NEC Corporation

( * ) Notice: Subject to any disclaimer, the term of this patent is extended or adjusted under 35 U.S.C. 154(b) by 35 days.

This patent is subject to a terminal disclaimer.

(21) Appl. No.: 16/855,179

(22) Filed: Apr. 22, 2020

(65) Prior Publication Data

US 2020/0293040 A1 Sep. 17, 2020

Related U.S. Application Data

(63) Continuation-in-part of application No. 16/568,747, filed on Sep. 12, 2019, now Pat. No. 11,089,432.

(60) Provisional application No. 62/838,358, filed on Apr. 25, 2019, provisional application No. 62/733,670, filed on Sep. 20, 2018.

(51) Int. Cl.
*G05D 1/00* (2006.01)
*G05D 1/02* (2020.01)

(52) U.S. Cl.
CPC ......... *G05D 1/0044* (2013.01); *G05D 1/0033* (2013.01); *G05D 1/0202* (2013.01)

(58) Field of Classification Search
CPC ... H04W 4/02; H04B 7/18506; G05D 1/0202; G05D 1/0033; G05D 1/0044
USPC ...................................... 455/456.1
See application file for complete search history.

(56) References Cited

U.S. PATENT DOCUMENTS

2004/0130463 A1* 7/2004 Bloomquist ..... G08G 1/096716
340/907

OTHER PUBLICATIONS

Bahl, P., and Padmanabhan, V. N. "Radar: An In-Building RF-based User Location and Tracking System", in INFOCOM 2000. Nineteenth Annual Joint Conference of the IEEE Computer and Communications Societies. Proceedings. IEEE (2000), vol. 2, Ieee, pp. 775-784.

(Continued)

*Primary Examiner* — Joel Ajayi
(74) *Attorney, Agent, or Firm* — Joseph Kolodka

(57) ABSTRACT

Systems and methods for localizing and tracking mobile objects are provided. A method includes determining an initial location of a node in a multi-hop network based on multi-lateration from an unmanned aerial vehicle. The method also includes applying an adaptive aperture to address a non-uniform velocity of the node based on the turn and a velocity vector. A determination whether localization for the node can be implemented using first hop nodes in the multi-hop network is made. In response to a determination that localization cannot be implemented using the first hop nodes, inertial sensor measurements associated with the node are accessed and the inertial sensor measurements are integrated with the adaptive aperture to improve localization accuracy.

20 Claims, 12 Drawing Sheets

(56) References Cited

OTHER PUBLICATIONS

Chintalapudi, K., Padmanabha Iyer, A., and Padmanabhan, V. N. "Indoor Localization Without The Pain", in Proceedings of the sixteenth annual international conference on Mobile computing and networking (2010), ACM, pp. 173-184.

Fahy, R. F., LeBlanc, P. R., and Molis, J. L. "Firefighter Fatalities in the United States—2017" NFPA (2018).

Gowda, M., Manweiler, J., Dhekne, A., Choudhury, R. R., and Weisz, J. D. "Tracking Drone Orientation With Multiple GPS Receivers", in Proceedings of the 22nd Annual International Conference on Mobile Computing and Networking (2016), ACM, pp. 280-293.

Gutierrez, J. A., Callaway, E. H., and Barrett, R. IEEE 802.15.4 "Low-Rate Wireless Personal Area Networks: Enabling Wireless Sensor Networks", IEEE Standards Office, New York, NY, USA, 2003.

Hughes, W. J. T. C. N. T., and Team, E. "Global Positioning System (GPS) Standard Positioning Service (SPS) Performance Analysis Report", WAAS FAA, 101 (2018).

PIX4D, "Do RTK/PPK drones give you better results than using GCPS?", available at "https://pix4d.com/rtk-ppk-drones-gcp-comparison/", last downloaded Feb. 20, 2020, pp. 1-9.

Tiemann, J., and Wietfeld, C. "Scalable and Precise Multi-UAV Indoor Navigation Using TDOA-based UWB Localization", in 2017 International Conference on Indoor Positioning and Indoor Navigation (IPIN) (Sep. 2017), pp. 1-7.

Van Diggelen, F., and Enge, P. "The Worlds First GPS Mooc and Worldwide Laboratory Using Smartphones", in Proceedings of the 28th International Technical Meeting of The Satellite Division of the Institute of Navigation (ION GNSS+ 2015) (2015), pp. 361-369.

Wang, H., Sen, S., Mariakakis, A., Roy Choudhury, R., Elgohary, A., Farid, M., and Youssef, M. "Unsupervised Indoor Localization", in Proceedings of the 10th international conference on Mobile systems, applications, and services (2012), ACM, pp. 499-500.

Adafruit Ultimate GPS Breakout, available at "https://www.adafruit.com/product/746", last downloaded Feb. 20, 2020, pp. 1-6.

Decawave, available at "http://www.decawave.com/", last downloaded Feb. 20, 2020, pp. 1-4.

DJI, DJI Phantom 4 Specs, available at "https://www.dji.com/phantom-4/info", last downloaded Feb. 20, 2020, pp. 1-13.

DJI, Mavic Pro Specs, available at "https://www.dji.com/mavic/info#specs", last downloaded Feb. 20, 2020, pp. 1-14.

Developer DJI, Mobile SDK, available at "https://developer.dji.com/mobile-sdk/documentation/introduction/index.html", last downloaded Feb. 20, 2020, pp. 1-2.

\* cited by examiner

900

Perform trajectory tracking of object
910

Determine initial location of node based on multi-lateration
915

Determine velocity vector associated with node
920

Detect turning of node
925

Apply adaptive aperture based on node turning
930

Implement multi-hop localization process to localize hops directly reachable by UAV first
935

Parallelize ranging measurements within each hop
940

Perform reverse location lookup
945

Determine initial location of node in multi-hop network based on multi-lateration
1210

Apply adaptive aperture to address non-uniform velocity of the node based on node turning and a velocity vector
1220

Localization can be implemented using first hop nodes?
1230

NO → Use inertial sensor measurements to localize the node
1240

YES → Perform localization based on first hop nodes
1250

FIG. 12

TRACKING INDOOR OBJECTS WITH INERTIAL SENSOR MEASUREMENTS

RELATED APPLICATION INFORMATION

This application claims priority to U.S. Provisional Patent Application Ser. No. 62/838,358 filed on Apr. 25, 2019, incorporated herein by reference in its entirety, and is a Continuation-in-Part application of U.S. patent application Ser. No. 16/568,747, filed on Sep. 12, 2019 which claims priority to U.S. Provisional Patent Application No. 62/733,670, filed on Sep. 20, 2018, incorporated herein by reference in its entirety.

BACKGROUND

Technical Field

The present invention relates to object tracking and more particularly object tracking using an unmanned aerial vehicle.

Description of the Related Art

Unmanned aerial vehicles (UAVs) are aircraft that do not have an onboard human pilot. UAVs can be included, along with a ground-based controller, in an unmanned aircraft system. The UAV and ground-based controller can communicate with a wireless communications system.

SUMMARY

According to aspects of the present invention, a method is provided for localizing and tracking mobile objects. The method includes determining an initial location of a node in a multi-hop network based on multi-lateration from an unmanned aerial vehicle. The method also includes applying an adaptive aperture to address a non-uniform velocity of the node based on a turning and a velocity vector. A determination whether localization for the node can be implemented using first hop nodes in the multi-hop network is made. In response to a determination that localization cannot be implemented using the first hop nodes, inertial sensor measurements associated with the node are accessed, and the inertial sensor measurements are integrated with the adaptive aperture to improve localization accuracy.

According to other aspects of the present invention, a system is provided for localizing and tracking mobile objects. The system includes a processor device operatively coupled to a memory device. The processor device determines an initial location of a node in a multi-hop network based on multi-lateration from an unmanned aerial vehicle. The processor device applies an adaptive aperture to address a non-uniform velocity of the node based on the turn and a velocity vector. The processor device also includes determines whether localization for the node can be implemented using first hop nodes in the multi-hop network. In response to a determination that localization cannot be implemented using the first hop nodes, inertial sensor measurements associated with the node are accessed and the inertial sensor measurements are integrated with the adaptive aperture to improve localization accuracy.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein:

FIG. 9 is a flow diagram illustrating a method for localizing and tracking an object, in accordance with an embodiment of the present invention;

FIG. 12 is a flow diagram illustrating a method for localizing and tracking an object, in accordance with an embodiment of the present invention.

DETAILED DESCRIPTION OF PREFERRED EMBODIMENTS

Figure 1:
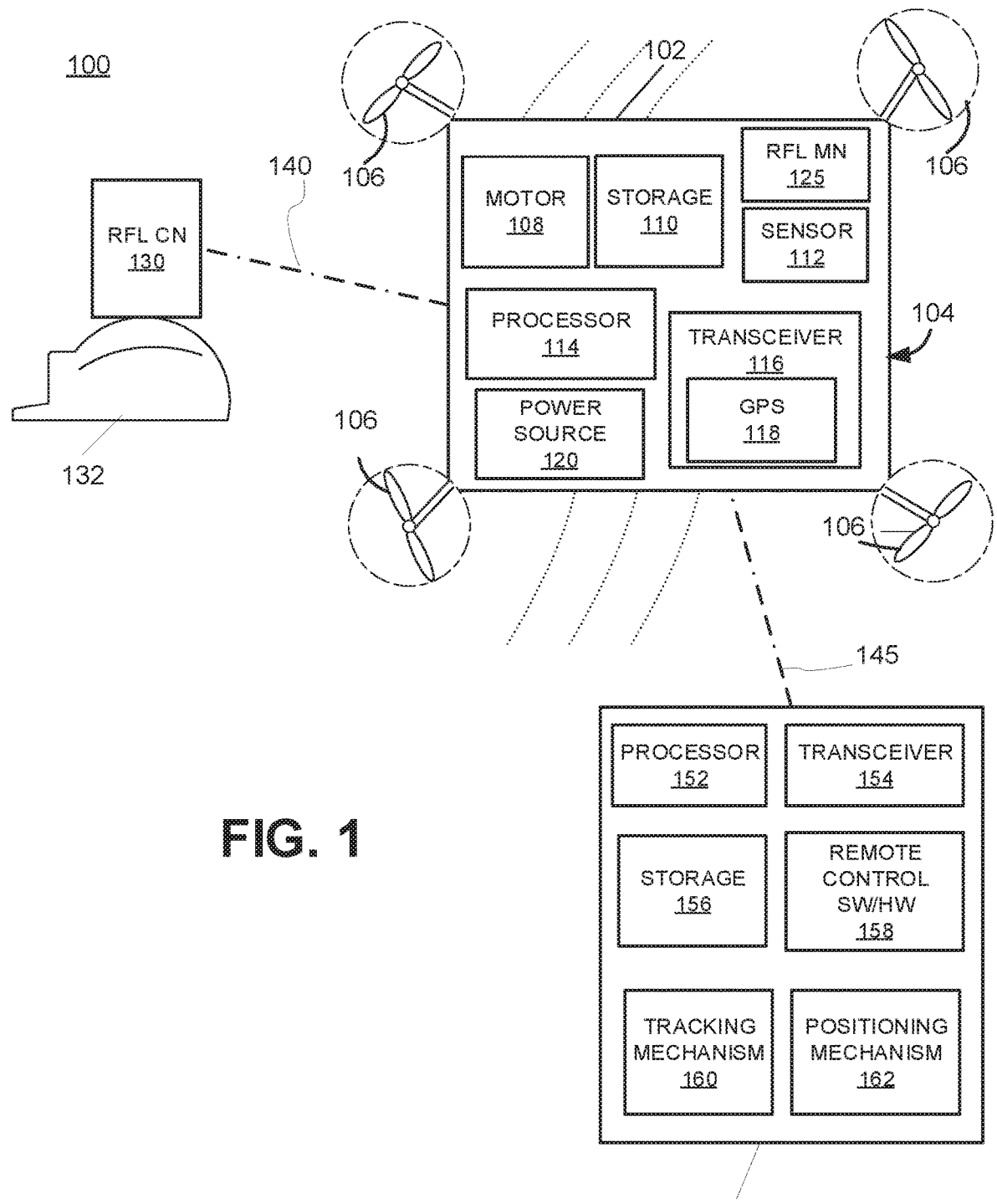
FIG. 1 is a block diagram illustrating a high-level system for localizing and tracking from an unmanned aerial vehicle (UAV), in accordance with an embodiment of the present invention.

In accordance with embodiments of the present invention, systems and methods are provided to/for (accurately) localizing and tracking mobile objects (for example, persons, responders, etc.) in real-time in (for example, large) indoor environments (such as, for example, a building, a structure, etc.) with use of inertial sensors integrated into the localization process. The systems and methods leverage a mobile virtual infrastructure provided by unmanned aerial vehicles (UAVs), with wireless technology for localization (for example, radio frequency (RF) communications technology such as ultra-wide band (UWB), which provides a balanced penetration and accuracy tradeoff, to localize and track objects directly from outside, without relying on access to any indoor infrastructure. The systems incorporate inertial sensor measurements to localize nodes in a multi-hop network.

Example embodiments of the system include a UAV-UWB based system that can localize and track mobile responders to within predetermined (for example, within a range of about/approximately 1 to 2 meters) accuracy from a single UAV operating outside of an indoor environment in real-time, such as deep indoor environments (for example, in excess of 40 to 50 meters indoors from a building's periphery). In instances in which the system includes multiple UAVs, the system can deploy the UAVs on different sections of a structure (for example, building, edifice, etc.) for wider, simultaneous coverage. In example embodiments, the system incorporates localization and tracking elements, including trajectory tracking, a multi-hop localization paradigm, concurrent ranging protocol, and reverse location look-up.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

Each computer program may be tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the localizing and tracking system 100 either directly or through intervening I/O controllers.

Network adapters may also be coupled to the localizing and tracking system to enable the data processing system to become coupled to other data processing systems or remote printers or storage devices through intervening private or public networks. Modems, cable modem and Ethernet cards are just a few of the currently available types of network adapters.

Referring now in detail to the figures in which like numerals represent the same or similar elements and initially to FIG. 1, a localizing and tracking system 100 is illustratively shown. The localizing and tracking system 100 includes an unmanned aerial vehicle (UAV) 102 including a radio frequency localization master node device (RFL MN) 125, a (for example, moving) node 132 (for example, a responder) with a RFL client node device (CN) 130 (for example, a UWB helmet for responders) and a ground station 150.

According to an embodiment, the UAV 102 includes a propulsion system 106. The propulsion system 106 can include propellers or other engines for flying the UAV 102. In another embodiment, the propulsion system 106 may include a jet engine or hover technology. The propulsion system 106 may include one or more motors 108, which may include an internal combustion engine, electric motor, etc.

The UAV 102 may include a power source 120. The power source 120 may include or employ one or more batteries, liquid fuel (e.g., gasoline, alcohol, diesel, etc.) or other energy source. In another embodiment, the power source 120 may include one or more solar cells or one or more fuel cells. In another embodiment, the power source 120 may include combustive gas (e.g., hydrogen).

The UAV 102 may be equipped with computing functions and controls. The UAV 102 can include a processor 114. The UAV 102 can include a transceiver 116. In one embodiment, the transceiver 116 may be coupled to a global position system (GPS) 118 to generate and alert of a position of the UAV 102 relative to other vehicles and a common coordinate system. The transceiver 116 may be equipped to communicate with a cellular network system. In this way, the UAV's 102 position can be computed based on triangulation between cell towers base upon signal strength or the like. The transceiver 116 may include a Wi-Fi or equivalent radio system.

The UAV 102 can include one or more sensors 112 for making different measurements. The measurements may include pressure, temperature, wind speed, wind direction, speed, acceleration, etc. The sensor 112 can include an optical sensor, an infrared (IR) sensor or a camera. The sensor 112 can include an accelerometer or other motion sensor. It should be understood that the different systems of the UAV 102 may be employed in combination to take or make different measurements needed for the control of the UAV 102 or locating the UAV 102 from the ground using telemetry or other techniques.

The UAV 102 can include memory storage 110. The memory storage 110 may include solid state or soft storage and work in conjunction with other systems on the UAV 102 to record data, run algorithms or programs, control the vehicle, etc. The memory storage 110 may include a Read Only Memory (ROM), random access memory (RAM), or any other type of memory useful for the present applications. UAV 102 can include RFL MN 125 (for example, a UWB master node) that collects range information from the client nodes (RFL CNs 130) inside the building. A module in the UAV 102 can be programmed as the RFL MN 125 and is responsible for collecting the range measurements from the RFL CNs 130. The RFL MN 125 can continuously range the RFL CNs 130 (for example, at about 6 Hz) and forward the information through a serial port. According to example embodiments, the UAV 102 uses radio frequency (RF) communications technology such as ultra-wide band (UWB), which provides a balanced penetration and accuracy tradeoff wireless technology for localization of the RFL CNs 130.

The UAV 102 can be controlled remotely. When controlled remotely, the UAV 102 can be controlled by a remote-control device over a wireless channel 140. This permits the user to dynamically position the UAV 102 where needed. The UAV 102 can be positioned relative to an RFL CN device 130.

RFL CNs 130 can include a (for example, single-chip, multiple chip) wireless transceiver based on ultra-wideband techniques and a reduced instruction set computing (RISC) architectures based microcontroller that is programmed with a multi-hop ranging protocol. A controller in the RFL CN 130 can include a system on a chip (SoC) with an integrated central processing unit (CPU) and an on-chip graphics processing unit (GPU) that reads from the port (for example, through a universal serial bus (USB)) and forwards the information (including range measurements) to the ground station 150 through a Wi-Fi interface. The RFL CNs 130 can detect their corresponding hop memberships and either directly range with the RFL MN 125 ($hop_1$) or other RFL CNs 130 ($hop_1$ nodes ($hop_2$)). According to an embodiment, RFL CNs 130 can be mounted on hard hats worn by responders.

The ground station 150 can include a processor 152, a transceiver 154, a storage 156, remote control software (SW)/hardware (HW) 158, a tracking mechanism 160 and a positioning mechanism 162. The transceiver 154 can communicate 145 with the UAV 102. In one embodiment, the transceiver 154 may communicate with a local area network (LAN), cellular system, Wi-Fi system, etc. The positioning mechanism 162 may receive axial adjustment commands from the ground station 150 through the connection 145. The axial commands along with the vertical and horizontal movements allow the positioning mechanism 162 to track or follow the UAV 102 as it travels. In one embodiment, the positioning mechanism 162 may have a tracking mechanism 160 to provide axial commands, which permit the ground station 150 to follow an object vertically and/or horizontally.

The ground station 150 can provide multiple services. The ground station 150 can continually locate the UAV 102 with the help of RF client nodes (for example, four UWB client nodes) that the ground station 150 is equipped with. The inter-node distances are fixed and known in advance. One or more of the nodes is equipped with a GPS receiver, which provides highly accurate stationary estimates over time. The ground station 150 is also responsible for localizing the responder or client nodes (RFL CNs 130).

The RFL CNs 130 can be mounted on (or otherwise positioned on/with) an object (for example, personnel, a responder, etc.) that is to be tracked inside an indoor environment. According to example embodiments, the RFL CNs 130 include UWB transmitters (and/or receivers) for communicating with the RFL MNs 125.

In one embodiment, the tracking mechanism 142 may include a laser tracker. The tracking mechanism 142 can allow a user to fly the UAV 102 and the positioning mechanism 162 can autonomously handle the tracking and gathering of positional information and optical data. In one embodiment, the positioning mechanism 162 may send telemetry data to the ground station 150. The telemetry data may include the position of the UAV 102. The telemetry data can include a three-axis location of the UAV 102 to show where the vehicle 102 was in relation to the positioning mechanism 162 and how high above the ground the UAV 102 traveled. The telemetry data can be used in creating a map of the locations the UAV 102 is positioned.

The remote-control software and hardware 158 can include a wire or an antenna for a wireless connection to the UAV 102, and the software to modulate the output commands as a signal along the connection. In one embodiment, the remote-control software and hardware 158 may be employed to guide the UAV 102 by a user input using the ground station 150. In another embodiment, the remote-control software and hardware 158 may send preprogrammed commands to the UAV 102 to position the UAV 102 within a predetermined distance from an RFL CN device 130 (for example, attached to a helmet 132 of a responder). In another embodiment, the remote-control software and hardware 158 may send preprogrammed commands to maintain a predetermined distance from the location of other UAVs 102 in an aerial configuration.

Figure 2:
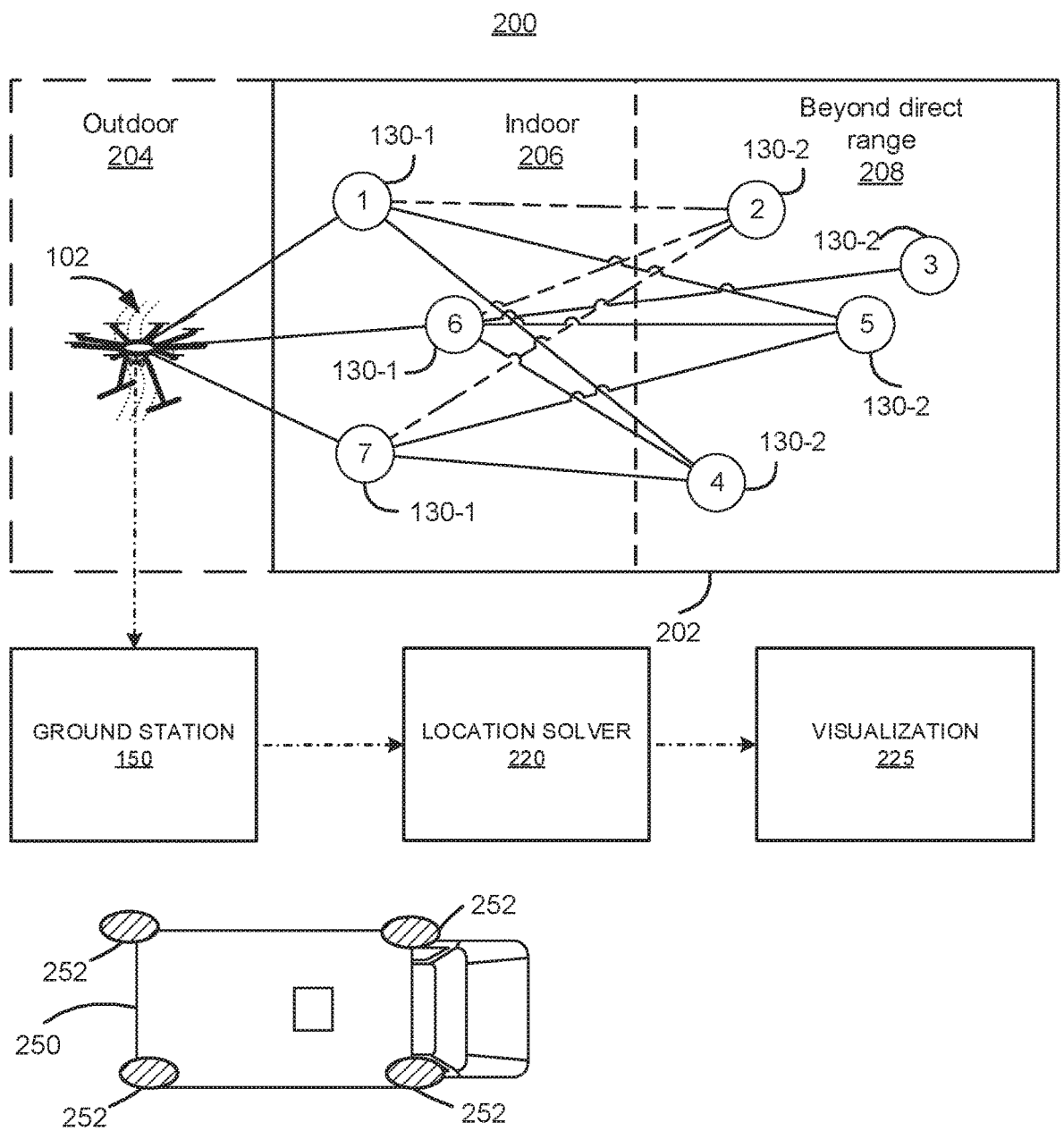
FIG. 2 is a block/flow diagram illustrating a scenario for implementing the system for indoor object tracking from a UAV, in accordance with an embodiment of the present invention.

FIG. 2 shows a scenario of indoor object tracking from a UAV using localizing and tracking system 100 in action along with its various architectural components, in accordance with example embodiments.

As shown ion FIG. 2, scenario 200 includes a building 202 with a UAV 102 deployed outside (outdoor 204). UAV 102 (for example, carrying a UWB MN 125) flying outside, can localize and track responders (carrying UWB CNs 130) accurately in real-time including in instances in which the responders (carrying UWB CNs 130) are mobile and/or (for example, deep, at a location blocked by one or more walls/floors/roofs/etc.) within a building 202. The UAV 102 can fly (or hover, or otherwise position itself) outside the building 202 to create a synthetic aperture of anchor points, from where the UAV 102 can range to each of the indoor nodes (UWB CNs 130, shown as nodes 1 to 7) using UWB, thereby allowing for subsequent localization of the UWB CNs 130 through multi-lateration. As shown in FIG. 2 the nodes function as direct or one-hop nodes (UWB CNs 130-1) within an indoor 208 range of the UAV 102 or indirect of multi-hop nodes (UWB CNs 130-2) that can be reached beyond direct range 208 through transmissions from other nodes (for example, node 2, UWB CN 130-2 transmits to UAV 102 via node 1, UWB CN 130-1).

The UAV 102 flying outside the building's 202 periphery is equipped with a UWB MN 125 that collects range information from the UWB CNs 130 inside the building 202. The UWB CNs 130 are possibly worn by personnel (for example, firefighters, military troops, emergency responders etc.) who can be tracked through the localizing and tracking system 100. UWB CNs 130 that are directly reachable from the RFL MN 125 (of UAV 102) are designated as $hop_1$ nodes (UWB CNs 130-1), additional nodes are referred to as $hop_2$ nodes (UWB CNs 130-2), $hop_3$ nodes (not shown in FIG. 2) and so on based on subsequent reachability. When range information from the UAV 102 is available, a location of the UAV 102 can be computed by multilateration. The UAV's location along with the remaining range information can be input to location solver 220 that localizes the client nodes (RFL CNs 130).

In FIG. 2, the UAV 102 directly ranges the nodes in $hop_1$ (UWB CNs 130-1) which in turn ranges the nodes in $hop_2$ and relays the information back to the UAV 102. The UAV 102 can send the range information to a ground control station 150 that can (for example, substantially) simultaneously solve for the locations (using location solver 220) of all client nodes (UWB CNs 130). Additionally, the localizing and tracking system 100 can provide a visualization component 225 (for example, a mobile application) that can be used to visualize the tracking information (of the CNs 130) on a map (for example, with sub-second latency). In an example embodiment, the map can include architectural details of a building in which a responder is located (for example, walls, doors, windows, etc.) including those determined by the UAV 102 and/or based on diagrams or maps received from secondary sources.

In contrast to deploying multiple UAVs to effectively serve as stationary base stations (BSs)/access points (APs) outside (which would require synchronization and may not guarantee access to a given indoor node), the localizing and tracking system 100 described herein can efficiently deploy UAVs 102 to cover (localize) responders in different sections of the building simultaneously, rather than to serve as stationary APs/BSs. The localizing and tracking system 100 localizes and tracks indoor responders in real-time by a single UAV 102 using a key degree of freedom of the UAV (for example, mobility).

The localizing and tracking system 100 (for example, via ground station 150) can be used to perform multiple functions (and/or provide multiple capabilities) to facilitate tracking and localization of RFL CNs 130 including accounting (and/or adjusting, compensating, etc.) for the mobility of responders, providing indoor coverage, performing real-time tracking and/or providing absolute location fix. In example embodiments, the localizing and tracking system 100 can include a UAV-UWB based system that is capable of localizing and tracking mobile responders to within a predetermined accuracy (for example, within 1-2 m accuracy) from a single UAV 102 located outside of a building 202 in real-time, including in deep indoor environments. When multiple UAVs 102 are available, the localizing and tracking system 100 can deploy the multiple UAVs 102 on different sections of the building 202 for wider, simultaneous coverage.

The mobility of the UAV 102 can be used to create a synthetic aperture over time, which can serve to provide reference points for localizing an indoor node1 (for example, RFL CN 130) through multi-lateration. In these instances of temporal dependency, multi-lateration approaches lave limited accuracy (for example, accuracy of a range of about/approximately 10 meters), when the indoor node (for example RFL CN 130) is also mobile. In instances in which the UAV's 102 speed is increased compared to RFL CN's 130 (for example, a responder's) mobility (to alleviate the impact of responder mobility), the localizing and tracking system 100 determines a lesser number of measurements with increased ranging errors. Instead of alleviating the impact of responder mobility, the system directly estimates the trajectory of the mobile responder (for example, RFL CN 130), rather than just a position of the RFL CN 130.

The localizing and tracking system 100 (for example, via ground station 150) provides trajectory tracking to account for the mobility of responders. The localizing and tracking system 100 can analytically instrument a multi-alteration formulation that estimates the position of the RFL CN 130 and the velocity (and direction) of the RFL CN 130. The localizing and tracking system 100 incorporates mechanisms for adaptively varying the size and choice of the synthetic aperture (anchor points used for localization) to address responders with non-uniform velocity (for example, those turning corners, etc.).

Regarding indoor coverage, the localizing and tracking system 100 implements a multi-hop localization of the RFL CNs 130. Localizing and tracking system 100 implements multi-hop localization for extended indoor coverage, where those RFL CNs 130 (for example, personnel, responders, etc.), directly reachable by the UAV 102 ($hop_1$, 130-1), are localized first. Then, the $hop_1$ nodes can be used to serve as anchors/relays for localizing additional nodes (for example, responders ($hop_2$, 130-2) that are reachable by the $hop_1$ nodes but not directly by the UAV 102. RFL CNs 130 can dynamically estimate their own hop status based on factors such as reachability to the UAV 102 and/or overheard ranging messages from neighboring RFL CNs 130. Localizing and tracking system 100 can account (or compensate, alleviate, etc.) for the deterioration in accuracy over hops (due to iterative localization), by analytically selecting (for example, only) upstream responders with accurate location estimates (for example, within a predetermined minimum confidence) as anchors for the downstream RFL CNs 130 (for example, responders, persons, etc.). Localizing and tracking system 100 implements this selection process based on a localization mechanism that helps identify responder location estimates with high (static, or uniform velocity) or low confidence (non-uniform velocity, turning, etc.). Localizing and tracking system 100 can thereby compensate for limitations in UWB's penetration capabilities, which, while better than mmWave, are limited to tens of meters and hence cannot guarantee reachability to all nodes. Localizing and tracking system 100 can thereby ensure reachability to those that are deep inside the building without deploying multiple UAVs outside different sections of the building to alleviate coverage issues. Localizing and tracking system 100 can thereby cover the entire indoor environment (for example, building 202).

Localizing and tracking system 100 can implement a (for example, UWB) protocol for real-time tracking of RFL CNs 130. The UWB protocol provides a framework of two-way ranging between two peer UWB nodes (UAV 102 and responder in our case). Localizing and tracking system 100 can compensate for a lack (or limitations) of scalability of a time division multiple access (TDMA) operational structure for collecting enough ranging measurements to all RFL CNs 130 (for example, UWB nodes) from the UAV 102 in a real-time tracking in a large network. Localizing and tracking system 100 implements a concurrent ranging protocol to enable real-time tracking of a (for example, large, spread out, etc.) multi-hop network of responders (for example, dispersed throughout vertically and/or horizontally large buildings). Localizing and tracking system 100 can transform UWB's sequential ranging protocol into an efficient, concurrent protocol. Localizing and tracking system 100 can leverage the broadcast nature of the wireless medium to parallelize the ranging measurements within each hop, and/or efficiently multiplex ranging measurements between hops by allowing RFL CNs 130 to access upstream messages, while also eliminating redundant message transmissions. Localizing and tracking system 100 can thereby achieve an increase in speed (for example, in the range of three time (3×), resulting in a location update frequency that allows for real-time tracking (for example, frequency of 6 Hz or higher).

Localizing and tracking system 100 can determine an absolute location fix for the RFL CNs 130. Since the UAV 102 localizes the RFL CNs 130 with respect to its own position, to get the absolute location fix of the RFL CNs 130, localizing and tracking system 100 determines (for example, accurately estimates) the UAV's 102 position. Localizing and tracking system 100 implements a reverse location look-up to (for example, accurately) estimate the location of the UAV 102 (for example, to within a meter) when the UAV 102 is mobile. According to an example embodiment, localizing and tracking system 100 estimates the location of the UAV 102 by itself, without using the UAV 102 as an anchor, by leveraging UWB. More particularly, localizing and tracking system 100 can use (for example, four) static RFL (for example, UWB) beacons 252, deployed, for example, on the roof corners of a responder service vehicle 250, as anchors. One or more of the RFL beacons 252 can also be fitted with a global positioning system (GPS) receiver (whose stationary estimates over time can be highly accurate). Localizing and tracking system 100 can use the GPS information coupled with known inter-beacon distances to determine accurate localization of the UAV 102. Localizing and tracking system 100 can thus be implemented, in some example embodiments, with UAVs 102 with a single GPS receiver, thereby lowering the cost of implementation (for example, without multiple GPS receivers and/or inertial sensor fusion to provide position accuracy). For example, localizing and tracking system 100 can use lower-end UAVs 102 with a single GPS receiver that provides accuracy limited to around 2-3 meters owing to the mobility of the UAV 102 and the resulting limited measurements (at a location).

Localizing and tracking system 100 can implement reverse lookup for UAV location fix. Obtaining the UAV's 102 precise GPS location is central to localizing and tracking system's 100 end-end accuracy. In cases, where precise UAV location estimates are not possible, localizing and tracking system 100 leverages UWB to also localize the UAV 102. As described herein above, localizing and tracking system 100 can include static UWB nodes as anchors at known locations on the ground. One of these anchors can be fitted with a GPS receiver. The latter's GPS measurements along with the known, exact, pairwise distances between the anchors, enables localizing and tracking system 100 to accurately determine the GPS coordinates of these static anchors. These static anchors in turn allow for accurate localization of the UAV itself. In example embodiments these anchors can be permanently mounted at the four corners of a service vehicle (for example, at different heights to provide vertical diversity).

Figure 3:
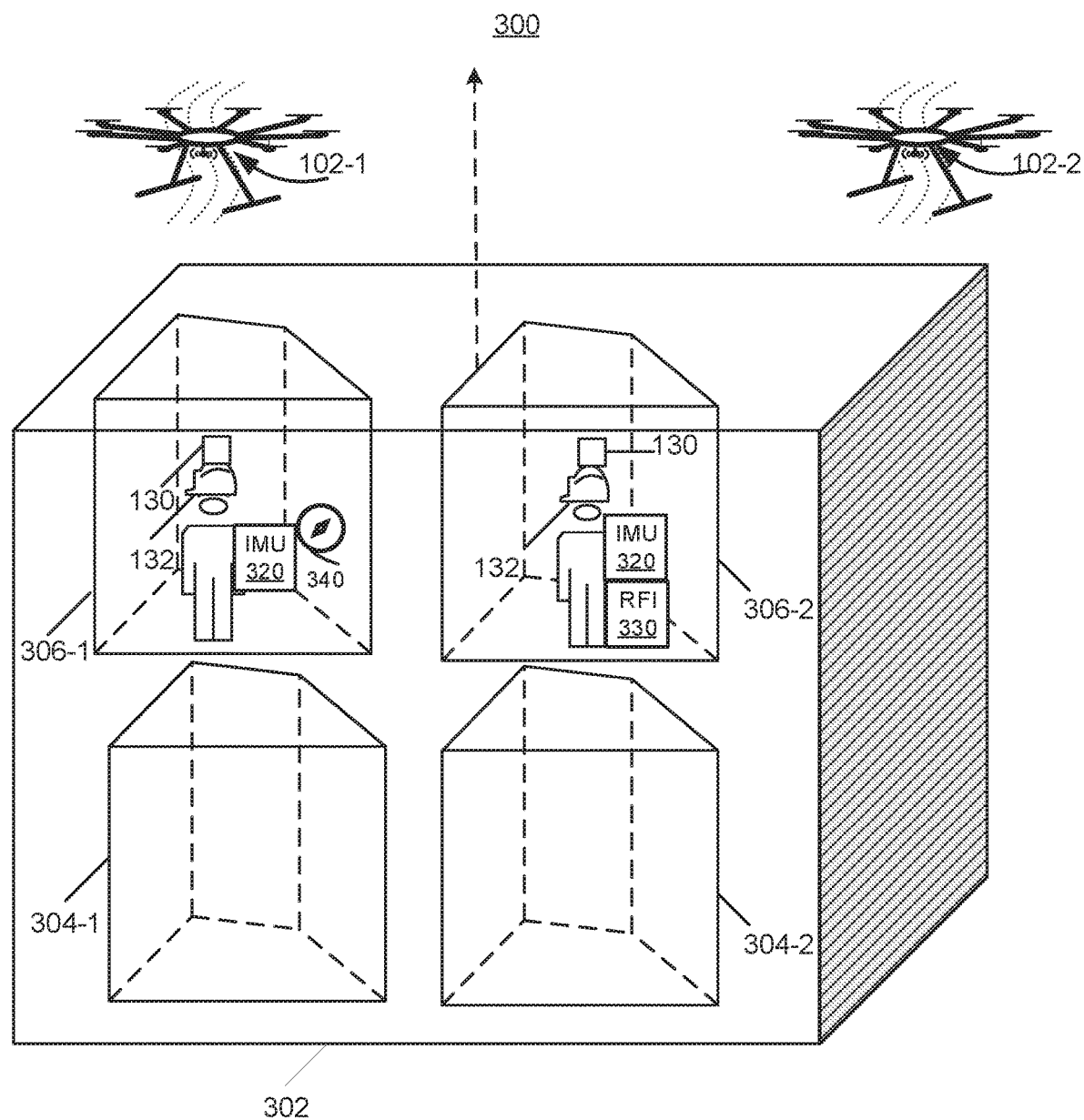
FIG. 3 is a block/flow diagram illustrating a scenario of the localizing and tracking system in action along with its various architectural components, in accordance with an embodiment of the present invention.

FIG. 3 shows a scenario of the localizing and tracking system 100 in action along with its various architectural components, in accordance with example embodiments.

As shown in FIG. 3, multiple UAVs 102 (illustrated as UAV 102-1 and UAV 102-2 by way of example, there may be more than two) can be deployed on different sections of the building 102 and/or at different altitudes of the same section (for example, for tall buildings) for wider, simultaneous coverage. Each UAV 102 can execute localizing and tracking in parallel (with other UAVs 102). The ensuing discussion with respect to a single UAV's 102 operation can be applied to multiple UAVs 102 operating in parallel. Also, for easier exposition, the discussion is directed towards the UAV 102 localizing RFL CNs 130 (for example, on helmets 132 of responders) in a single floor (horizontal plane) by fixing its altitude appropriately. The UAV 102 can scan floors and identify an appropriate altitude as described with respect to FIG. 4 herein below.

In many instances, for a mobile node (for example, RFL CN 130), the <location; range>tuples measured by the UAV 102 do not uniquely map to a single location, resulting in poor localization accuracy of multilateration solvers. Instead of alleviating the impact of mobility, localizing and tracking system 100 directly estimates the trajectory (speed and heading) of the mobile node, rather than just a position of the RFL CN 130. To accomplish this, localizing and tracking system 100 analytically instruments the multi-alteration formulation to estimate both the initial location (x; y) as well as the velocity vector ($V_x\hat{i}+V_y\hat{j}$), where $\hat{i}$ and $\hat{j}$ are unit vectors along positive X and Y axes respectively of the node. Using these, localizing and tracking system 100 can trace the node's traversed path. Localizing and tracking system 100 can operate on an assumption that human mobility can be approximated with uniform velocity, which is reasonable within the short time-scales (for example, a few seconds) of the UAV's 102 synthetic aperture. Localizing and tracking system 100 also accounts (or compensates, calculates, etc.) for non-uniform mobility (e.g., turning corners, etc.).

In an example embodiment, localizing and tracking system 100 receives ranging measurements from n consecutive UAV 102 locations. In this instance, n is referred to as the aperture size and is a moving window of n historical measurements. For any time instant Ti (i=[1 . . . n]), the UAV 102 records the mapping <(locationi; rangei>, where location i is the UAV's 102 three dimensional (3D) location and rangei is the distance estimate of the mobile node from the UAV. The mobile node is located at an unknown location ($x_i$; $y_i$; $z_i$). Localizing and tracking system 100 can expand the UAV's 102 3D-location to ($Cx_i$; $Cy_i$; $Cz_i$). The measured range is given by:

$$\text{range}_i = \sqrt{(Cx_i - x_i)^2 + (Cy_i - y_i)^2 + (Cz_i - z_i)^2} \qquad \text{Eqn. (1)}$$

In an instance in which the building floor (for example, horizontal plane) on which the RFL CN 130 (for example, a responder) is currently located, for the vertical coordinate $z_i$ can be deduced. The resulting equation includes two unknowns that are related through the node's velocity. Assuming the node is moving at a constant velocity, there are inherently only four unknowns, velocity and position in the x and y axis (x1; y1; V x; V y). Given 5 range estimates, localizing and tracking system 100 can solve for the four unknowns.

Localizing and tracking system 100 can determine a minimization to find the best fitting location and velocity; effectively, minimizing the error function:

$$f = \sum_{i=1}^{n} ((Cx_i - x_i)^2 + (Cy_i - y_i)^2 + (Cz_i - z_i)^2 - \text{range}_i^2)^2 \qquad \text{Eqn. (2)}$$

Localizing and tracking system 100 can obtain the various (xi; yi; zi) coordinates from the initial (x1; y1) and velocity (Vx; Vy) based on kinematic equations.

$$x_i = x_{i-1} + V_x \cdot \Delta T_i \qquad \text{Eqn. (3)}$$

$$y_i = y_{i-1} + V_y \cdot \Delta T_i \qquad \text{Eqn. (4)}$$

where $\Delta T_i$ denotes the time between measurements, and i=[2 . . . n].

Since ($x_i$; $y_i$) are generated based on the initial location ($x_1$; $y_1$) and the velocity vectors ($V_x$; $V_y$), by minimizing Eqn. (2), localizing and tracking system 100 can obtain the closest approximation of both, location and velocity vectors. Note that the first output from this solver is obtained only after n measurements (for example, a few seconds worth of data) have been recorded, and thereafter, a location update can be obtained for every round of range measurement. The steady state update rate of the system 100 can depend on the time the system 100 takes to obtain range measurements from all nodes (RFL CNs 130) and does not depend on the aperture size.

In example embodiments, the responders can be equipped with inertial measurement units (IMUs) 320. The IMUs 320 can provide information from compass 340, accelerometer, and gyroscope (each, for example, incorporated into the IMU 320, accelerometer and gyroscope not separately shown for clarity of illustration) that can be used to compute relative displacement using dead reckoning algorithms. The IMUs 320 can provide inertial measurements that include user direction and user velocity to the system 100, which can be used, for example, in a manner as described with respect to FIGS. 10 and 11 herein below.

In example embodiments, the responders can be equipped with radio frequency imaging units (RFIs) 330. The RFIs 330 can implement RF imaging capabilities to enable localized nodes to image objects that are visually occluded, such as say objects on the other side of a wall.

Figure 4:
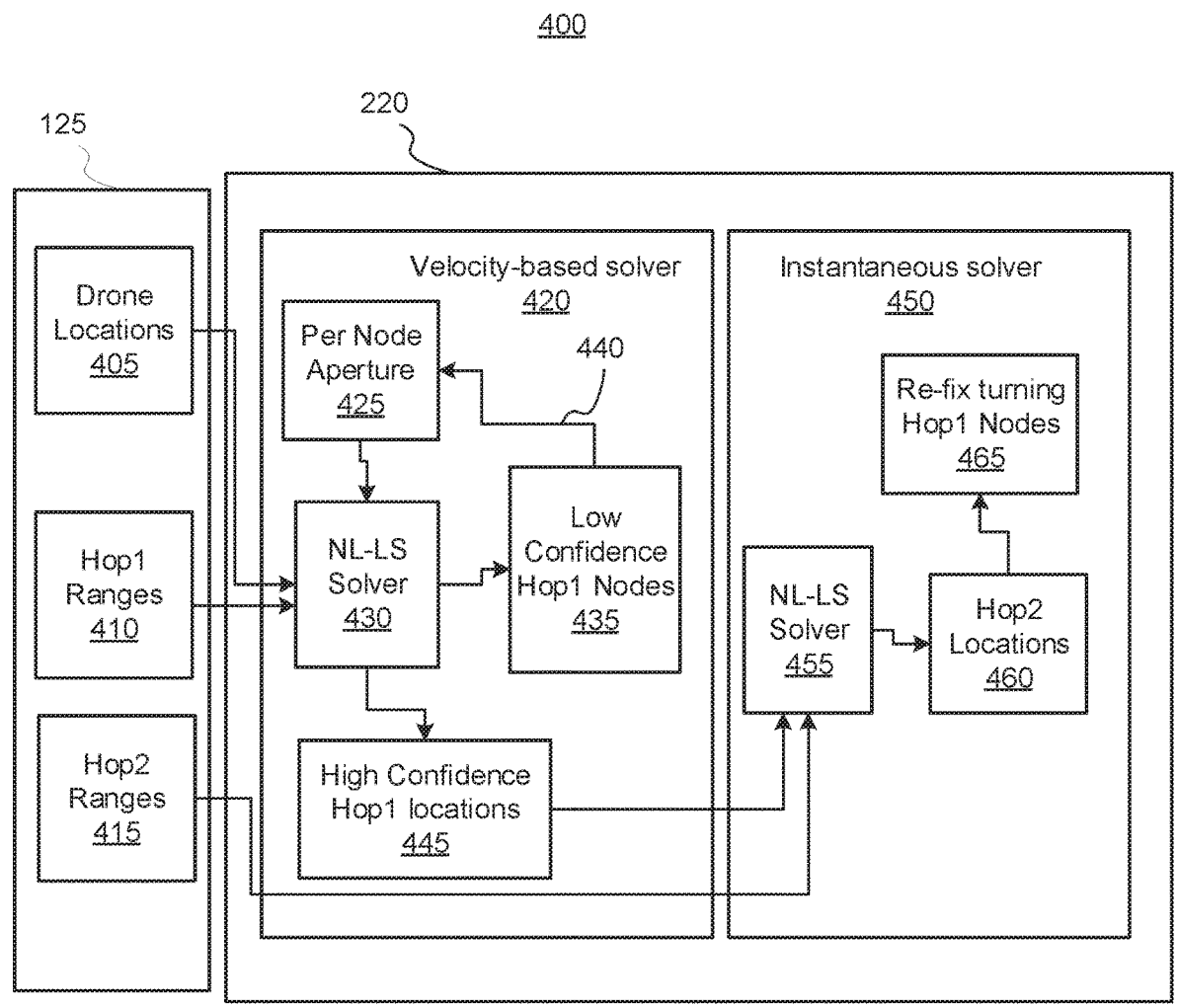
FIG. 4 is a block diagram illustrating components of master node and location solver, in accordance with an embodiment of the present invention.

Referring now to FIG. 4, components of master node 125 and location solver 220 are illustratively shown, in accordance with example embodiments.

As shown in FIG. 4, an RFL MN 125 can include drone locations 405, $hop_1$ ranges 410 and $hop_2$ ranges 415. Location solver 220 includes a velocity-based solver 420 and an instantaneous solver 450.

Velocity based solver 420 includes a per node aperture 425, and a non-linear least squares (NL-LS) solver 430 that generates high confidence hop-1 locations 445 or low confidence hop-1 nodes. If NL-LS solver 430 identifies low confidence nodes, a reset aperture command 440 is provided to the per node aperture 425.

Instantaneous solver 450 determines a location at an instant (for example, a few seconds) of turning of the nodes. Instantaneous solver 450 includes NS-LS solver 455 that determines $hop_2$ locations 460. The $hop_2$ locations 460 are used to re-fix turning $hop_1$ nodes 465.

When a UAV 102 is launched on a section of the building (for example, building 202 described with respect to FIG. 3), the static UWB (for example, ground station 150) anchors on the ground start localizing the UAV 102 to determine a (for example, precise) location estimate for the UAV 102. The UAV 102 performs a flight trajectory and thereby creates a continuous, moving window of synthetic apertures (for example, of a predetermined duration, such as 4 secs each). Within each aperture window, the UAV 102 performs the following: The UAV 102 (via localizing and tracking system 100) executes a concurrent ranging protocol to (for example, help, determine, etc.) classify nodes (for example, RFL CNs 130) into various hops based on a reachability of each of the hops from the UAV 102. The localizing and tracking system 100 then localizes the $hop_1$ nodes first using velocity-based solver 420 that estimates both the location and velocity of the $hop_1$ nodes. Using the error residuals of the velocity-based solver 420 (particularly, of NL-LS solver 430), the UAV 102 employs only the high-confidence (uniform velocity) $hop_1$ nodes 445 as anchors for localizing the $hop_2$ nodes (via instantaneous solver 450). For localizing the $hop_2$ nodes, localizing and tracking system 100 employs a multi-lateration solver (NL-LS solver 455) to obtain the location of $hop_2$ nodes 460. Finally, localizing and tracking system 100 (via re-fix of turning hope nodes 465) uses a spatial aperture of $hop_2$ nodes (anchors), along with an adaptive (temporal) aperture from the UAV 102, to refine the location estimate of the $hop_1$ nodes that have non-uniform velocity (or direction).

UAV 102 can also adjust for altitude considerations. As discussed herein above, the discussions of the determinations by the UAV 102 focused on the horizontal plane and assume that localizing and tracking system 100 is aware of the nodes' altitude. However, in cases when localizing and tracking system 100 does not have information regarding the horizontal plane (for example, the floor) where the nodes (for example, service personnel) are currently located, the horizontal localization error (in instances that does not account for variances in the vertical coordinate) can be significant (since, in these instances, the localizing and tracking system 100 will not take into account the additional vertical offset the signals have to travel). Localizing and tracking system 100 can mitigate such situations by detecting the appropriate altitude (and hence floor) through a mitigating maneuver of the UAV 102. Localizing and tracking system 100 can move the UAV 102 up and down through a (for example, short, limited) vertical distance that spans the target floors. During this movement, as the UAV 102 approaches the horizontal plane of the nodes 130, range estimates to the nodes 130 decreases, reaching a minimum when the UAV 102 is on the horizontal plane, and increasing when the UAV 102 moves away from the plane. Localizing and tracking system 100 can record the altitude as that corresponding to the minimum range estimates and determine the floor of interest. Localizing and tracking system 100 can then use this altitude to execute a localization process for the RFL CNs 130 on the target floor.

Figure 5:
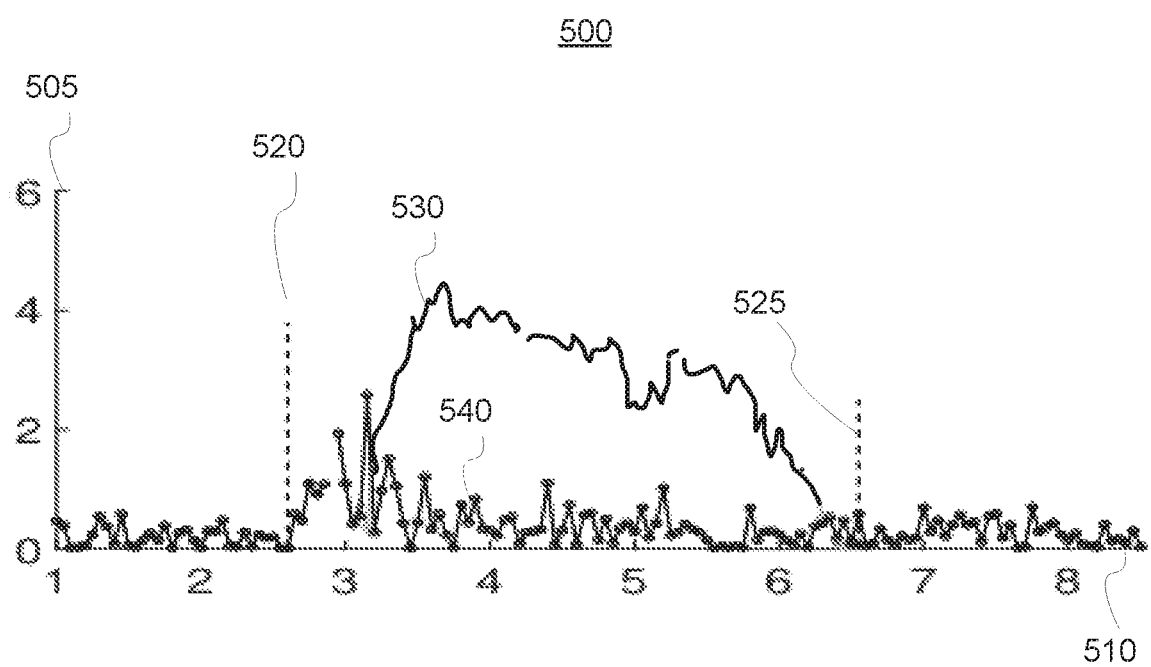
FIG. 5 is a block diagram illustrating a scenario of resetting an aperture to limit a loss in localization accuracy, in accordance with an embodiment of the present invention.

FIG. 5 illustrates a scenario 500 of resetting an aperture to limit a loss in localization accuracy, in accordance with example embodiments.

Localizing and tracking system 100 can analyze the improvement in localization accuracy achieved by incorporating velocity vectors over simple multilateration.

Although solving for velocity vectors improves localization performance of the mobile nodes by an order of magnitude compared to naive multilateration, that approach assumes that the node (RFL CN 130) does not change velocity (speed and/or direction) during the course of one aperture window (for example, 4 secs). This assumption is incorrect (for example, faulty, broken) if the node turns, accelerates, decelerates or halts. In example embodiments, this variation in velocity can be solved by adding higher order derivatives of the node's location (e.g., acceleration, jerk) into the kinematics equations employed by our location solver. However, this approach (of adding higher order derivatives) can make the velocity-based solver 420 prone to overfitting and extremely sensitive to range errors. Further, given the short time scale of the aperture window, an approximation of uniform velocity does not significantly performance during acceleration and halting but does induce significant errors during turns, which localizing and tracking system 100 can account for by utilizing the solver's confidence in the estimated location to infer non-uniform velocity and when detected, salvaging (or correcting, attempting a salvage, etc.) by shunning historic measurements.

FIG. 5 shows the impact of sudden turns on the localization error (y-axis, 505) over time (x-axis, 510, measured in seconds) for a node without an adaptive aperture (straight line 530) as compared to use of an adaptive aperture (dotted line 540) (see key 515). FIG. 5 illustrates measurements of a node moving in a straight line, then taking a 90° turn (at turning instant 520) and continuing again in a straight line. A predetermined aperture (for example, an aperture of 4 seconds), UAV 102 locations and the corresponding ranges of the past aperture (for example, 4 seconds) can be used to estimate the current node location. The localization error without use of an adaptive aperture (straight line 530) starts to increase from the point where the aperture's head crosses over the turning position (first dashed vertical line 520) and falls back to its pre-turn values after the aperture's tail has crossed over the turning position (second dashed vertical line 525).

Localizing and tracking system 100 can implement an adaptive aperture to address turns. If localizing and tracking system 100 detects turns, localizing and tracking system 100 can eliminate historic measurements that have occurred preceding the turn and restart building up the aperture. At the time of the turn, localizing and tracking system 100 removes all history and restarts estimating location after a short history has built up. Just after resetting history, the localization error can be high (dotted line 540 in FIG. 5) but quickly recovers and becomes acceptable once the aperture fills up with relevant measurements after the turn. In comparison, without an adaptive aperture, the effects of a turn last for the entire duration of the aperture (straight line 530).

Localizing and tracking system 100 can trigger an adaptive aperture based on a mechanism that detect turns. The core reason for the worsening of localization error during turns is that the velocity-based solver 420 is unable to provide a sufficient answer because no single velocity estimate can represent all the measurements. This inherently results in larger residual errors after solving Eqn. 2. The residuals are highly correlated with localization error. Thus, a sudden increase in the residuals helps identify non-uniform velocity situations such as turns. Localizing and tracking system 100 can implement Gaussian mixture models on the residuals to identify low solver confidence. Localizing and tracking system 100 can use any unsupervised clustering mechanism that can differentiate the higher solver errors from the lower solver errors.

In summary, localizing and tracking system 100 can localize mobile nodes, including those with non-uniform velocity, through a combination of joint location-velocity solving and by adaptively resetting the aperture size. At any given instant, different nodes (RFL CNs 130) in the topology can utilize different aperture sizes, and the n thus becomes a node specific value.

Figure 6:
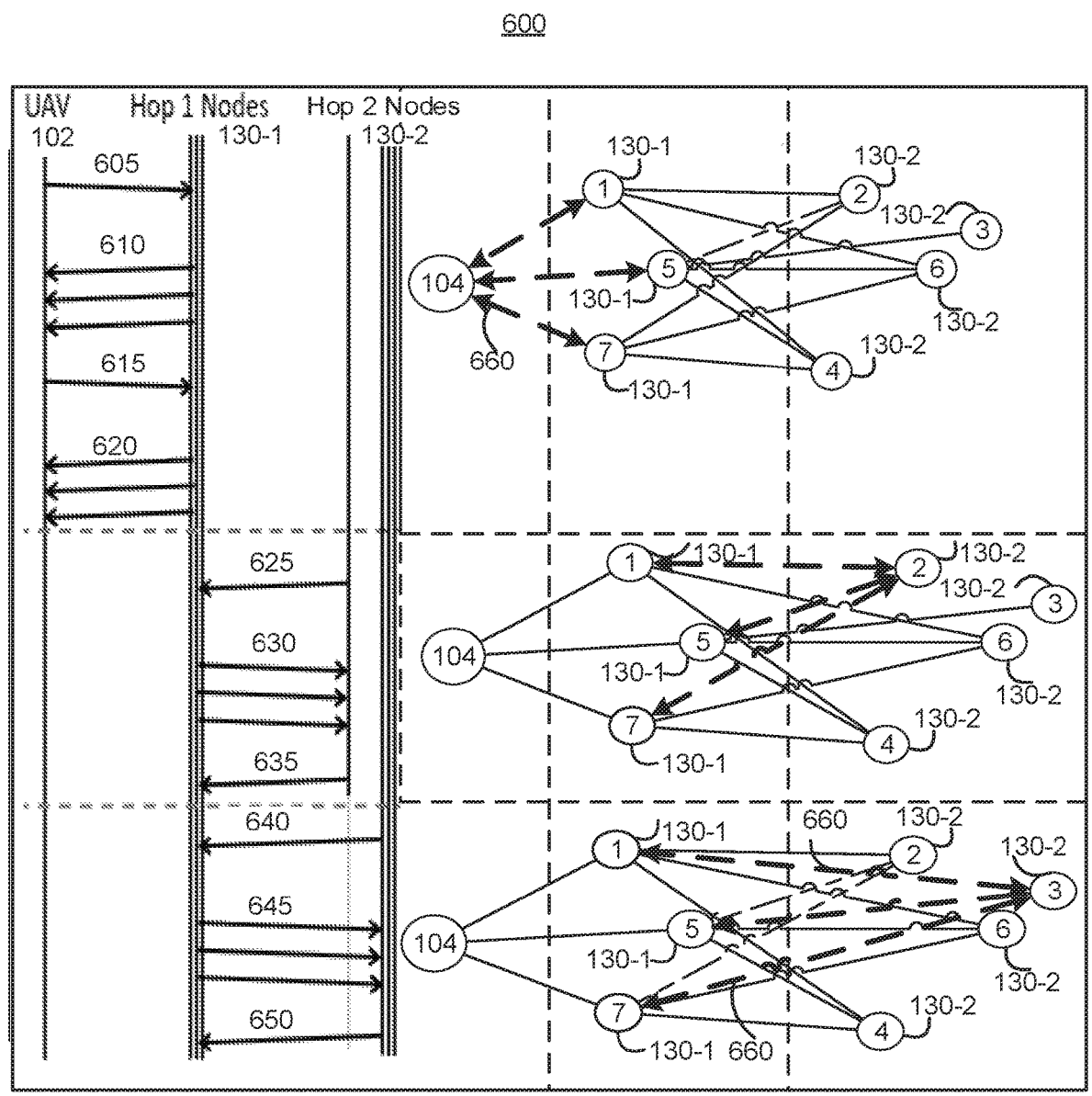
FIG. 6 is a block diagram illustrating scenario of multi-hop tracking for extended coverage, in accordance with an embodiment of the present invention.

FIG. 6 illustrates a scenario 600 of multi-hop tracking for extended coverage, in accordance with example embodiments.

As shown in FIG. 6, the left-hand side of the diagram represents communications (605 to 650) between nodes in a network. The right-hand side of FIG. 6 provides an illustration of the positioning of the nodes in which the distances are not drawn to scale and serve to illustrate the limits of ranging between nodes. The heavier broken lines 660 in FIG. 6 indicate ranging between nodes.

Localizing and tracking system 100 can implement multi-hop tracking for extended coverage. Localizing and tracking system 100 includes a framework that is adaptable to situations in which some nodes (RFL CNs 130-2 and further nodes) are not directly reachable from the UAV 102. Localizing and tracking system 100 can allow (or facilitate, etc.) such unreachable nodes (RFL CNs 130-2) to range with other nodes in the vicinity (for example, RFL CNs 130-1) which can in-turn reach the UAV 102 and/or have already been localized. Thus, a multi-hop topology is dynamically created with nodes belonging to different hops based on their reachability characteristics (from the UAV 102). The UAV's 102 synthetic aperture localizes first hop (directly reachable) nodes (RFL CNs 130-1, such as 1, 7, 5 in FIG. 6) using the location solver 220. These location estimates of the first hop nodes and the distance measurements between the $hop_1$ and $hop_2$ nodes are then used to localize the second hop ($hop_2$) nodes. Location solver 220 can iterate this process across hops (for example, to a $hop_3$ or $hop_4$ node, etc.). Localizing and tracking system 100 can implement one or more of several mechanisms to ensure that mobile nodes (RFL CNs 130) can be accurately localized (including across multiple hops).

RFL CNs 130 can perform dynamic estimation of hop membership. Nodes (RFL CNs 130) that are within the UAV's 102 (for example, UWB) communication range, directly receive ranging messages initiated by the UAV 102, can classify themselves as $hop_1$ nodes. Those nodes that do not receive messages from the UAV 102 but receive some of the response messages sent by $hop_1$ nodes, classify themselves as $hop_2$ nodes and so on. Thus, nodes can dynamically switch between hops based on their location and message reception characteristics.

Localizing and tracking system 100 can intelligently select anchors for iterative localization. Two components contribute to the localization error of $hop_m$ nodes: (a) relative localization error of $hop_m$ nodes with respect to hopm-1 nodes, and (b) localization error of $hop_{m-1}$ nodes. Without loss of generality, $hop_{m-1}$ nodes can be assumed to be spaced far apart compared to the synthetic aperture formed by the UAV 102. This increased spacing between anchors allows for better localization of $hop_m$ nodes with respect to $hop_{m-1}$ nodes, compared to that of $hop_1$ nodes (with respect to the UAV 102). However, the localization error of the $hop_{m-1}$ nodes and recursively that of upstream hop nodes, will cumulatively contribute to the error of $hop_m$ nodes.

Thus, the choice of anchors in $hop_{m-1}$, has a cascading impact on the localization accuracy of downstream hop nodes (hops≤m). Nodes that experience uniform velocity in $hop_{m-1}$ inherently have better localization accuracy compared to those with non-uniform velocity. Hence, localizing and tracking system 100 leverages the location solver's 220 ability to identify nodes with low confidence (in its location estimate) by avoiding nodes with non-uniform velocity as anchors for localizing $hop_m$ nodes. Localizing and tracking system 100 can thereby curtail the cascading of localization error across hops.

Localizing and tracking system 100 can decouple nodes from the UAV 102 for better mobility tracking across hops. In contrast to the first hop nodes which are localized through a temporal aperture created by the UAV's 102 motion, $hop_m$ (m>1) nodes can be localized through a spatial aperture formed from a diverse placement of $hop_{m-1}$ nodes. This decoupling (from UAV's 102 mobility), allows for instantaneous localization of $hop_m$ nodes from previously obtained $hop_{m-1}$ locations. The time scale of such localization can be milliseconds within which the nodes move a negligible distance. As a result of the spatial aperture employed, $hop_m$ (m>1) nodes can use conventional multilateration approaches (without need for velocity vectors) including in instances when they are mobile.

Localizing and tracking system 100 can address $hop_1$ nodes with non-uniform velocity using downstream spatial apertures. Unlike $hop_1$ nodes, mobility is not of concern for $hop_m$ (m>1) nodes as these nodes can be instantaneously (for example, within a second) localized using a spatial aperture formed from high-confidence $hop_{m-1}$ nodes. Hence, $hop_2$ nodes can in turn, form a spatial aperture (for example, serve as anchors) that can be used to correct (or determine) the location of $hop_1$ nodes, which are currently experiencing non-uniform velocity (low confidence). Localizing and tracking system 100 can eliminate most of (for example, reduce significantly) the impact of nonuniform velocity of $hop_1$ nodes.

Note that localizing and tracking system 100 can implement the downstream spatial aperture technique in an opportunistic manner based on whether enough $hop_2$ nodes exist. In contrast, the mechanism of adaptive (temporal) aperture of the UAV 102 provides benefits even when no other $hop_2$ nodes exist in the topology. Thus, localizing and tracking system 100 incorporates both these techniques to address nonuniform velocity of $hop_1$ nodes.

Localizing and tracking system 100 can leverage multiple UAVs 102 vs. multiple hops. While multi-hop localization allows for coverage of even large buildings using a single UAV 102, the localization error of its downstream hop nodes (e.g., m>2) will increase and in some instances may not satisfy a target confidence level (for example, a target of 1-2 m). Hence, localizing and tracking system 100 can leverage the multi-hop paradigm to primarily reach deep interiors of buildings (where even multiple UAVs 102 cannot help), and employs multiple UAVs 102 to provide non-overlapping, peripheral coverage for large buildings. Thus, using a combination of multiple UAVs 102 and multi-hops, localizing and tracking system 100 covers (for example, even large) buildings with two hops.

As shown in FIG. 6, localizing and tracking system 100 can implement concurrent ranging for real-time tracking. localizing and tracking system 100 uses a fast and reliable ranging protocol to implement a real-time localization system. Since the UWB's (802.15.4) ranging protocol is designed for ranging between a pair of nodes, UWB's (802.15.4) ranging protocol does not broadcast messages. This leads to a sequential ranging of every pair of nodes within a hop, which is not scalable for real-time operation, especially in a multi-hop network. Localizing and tracking system 100 leverages the broadcast nature of wireless signals to communicate and hence concurrently ranges with multiple nodes using a single transmission. Localizing and tracking system 100 can implement a protocol, such as shown in FIG. 6 that includes a concurrent ranging scheme. Although FIG. 6 and the discussion is directed with respect to the first two hops, the procedure is similar for other hops.

According to an example embodiment, localizing and tracking system 100 performs concurrent ranging within $hop_1$. The UAV 102 simultaneously initiates ranging with all reachable $hop_1$ nodes by broadcasting a POLL 605. Each node that receives this message, takes turns (for example, based on the node's hard-coded node identifier (NodeID)) to send a response (RESP) 610 message. After collecting the timings from all the RESPs 610, the UAV 102 sends a single FINAL message 615 containing information for all $hop_1$ nodes. At this point in the protocol, all $hop_1$ nodes have enough information to calculate their distance from the UAV 102. The nodes again take turns to send their distance estimates to the UAV 102 (DIST EST message 620).

Localizing and tracking system 100 can perform concurrent ranging within $hop_2$. $Hop_2$ nodes keep listening to the channel in a similar manner to $hop_1$ nodes. However, since $hop_2$ are not in direct communication range of the UAV 102, the $hop_2$ nodes cannot receive the POLL message 605. Instead, $hop_2$ nodes only receive the messages sent by nearby $hop_1$ nodes in response to the UAV's 102 POLL. After all $hop_1$ nodes have completed sending their DIST EST messages, $hop_2$ nodes take turn in initiating a full sequence of POLL-RESPs-FINAL (625-630-635) simultaneously with all $hop_1$ nodes in the vicinity. The nodes follow the same protocol as the UAV 102 with one key difference to reduce overhead in some example embodiments. $Hop_1$ nodes do not communicate distance estimates back to $hop_2$ nodes (no DIST EST is sent). The $hop_1$ node calculates and locally stores the $hop_1$ to $hop_2$ distance for every $hop_2$ node that initiated ranging. These distances are included as additional data (for example, piggybacked) on the next DIST EST message sent to the UAV 102 (that is being sent independently of the timing of collection of distance information). This saves unnecessary network overhead, speeding up the collection of range estimates.

Figure 7:
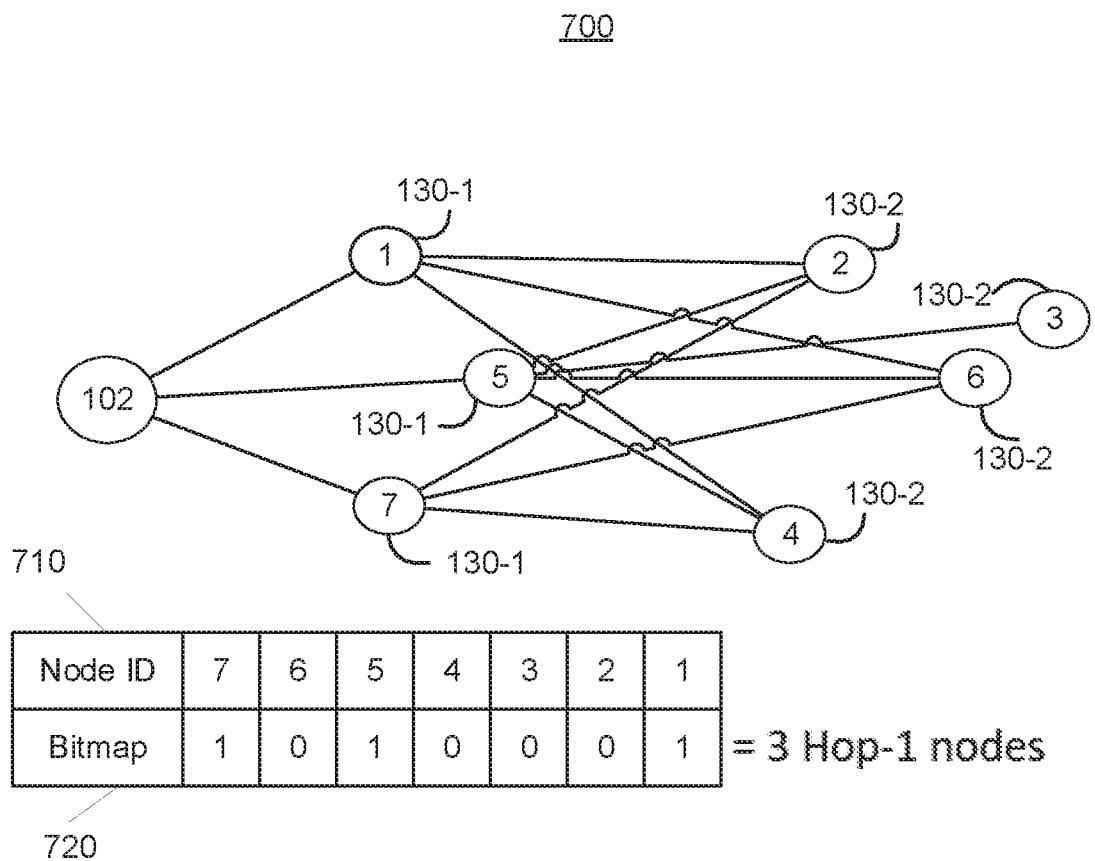
FIG. 7 is a block diagram illustrating a bitmap constructed by the UAV and sent in a FINAL message, in accordance with an embodiment of the present invention.

FIG. 7 illustrates a bitmap 700 constructed by the UAV and sent in a FINAL message, in accordance with example embodiments.

Localizing and tracking system 100 can implement efficient multiplexing of ranging between hops. When the UAV 102 initiates a POLL message, the UAV 102 is not aware of the topology. Hence, the UAV 102 waits for all the nodes in the network to send a RESP. Once the UAV 102 has received the last RESP (for example, after a timeout), the UAV 102 creates a bitmap 700 indicating which nodes are deemed to be in $hop_1$ (setting the bit to one) based on who responded. The UAV 102 sends this bitmap in its FINAL message. An example bitmap is shown in FIG. 7 in which node IDs 710 (for example, 7 to 1) corresponding to different nodes, and a corresponding bit 720 (0 or 1) are included. If a particular node had responded to the UAV's 102 POLL 605, but finds its own bit cleared in the received bitmap (for example node 6, 130-2), the node marks itself as being a $hop_2$ node and does not send the DIST EST. All nodes, which were deemed to be in $hop_1$ by the UAV 102 (their corresponding bit was set in the bitmap, for example nodes 1, 5 and 7 130-1), calculate their distance from the UAV 102 and send a DIST EST message that includes a copy of the same bitmap. A node that receives even a single such DIST EST and hence the bitmap, but not the POLL 605 from the UAV 102, would have its bit cleared and know that it belongs to $hop_2$. Also, the node would know which NodeIDs are expected to be in $hop_1$. The node can thus calculate the exact time when the last $hop_1$ node will be done sending its DIST EST. Moreover, the bitmap implicitly dictates the ordering of $hop_2$ nodes. This allows $hop_2$ nodes to efficiently take transmission turns without collision, even when they are not in communication range of each other. The bitmap is dynamically generated in every round before the UAV 102 sends its FINAL message. Hence, this protocol is able to handle fast changing topologies and allows nodes to dynamically move between being $hop_1$ and $hop_2$.

Finally, the DIST EST sent by $hop_1$ nodes piggybacks their distance from all $hop_2$ nodes obtained in the previous round, along with their own range estimates to the UAV 102. The DIST EST messages are variable-sized to accommodate any number of distance estimates without incurring extra overhead. The UAV 102 creates an adjacency matrix from the information contained in all the DIST EST messages it receives. The UAV 102 forwards this matrix to a ground control center (such as ground station 150) for further processing.

Figure 8:
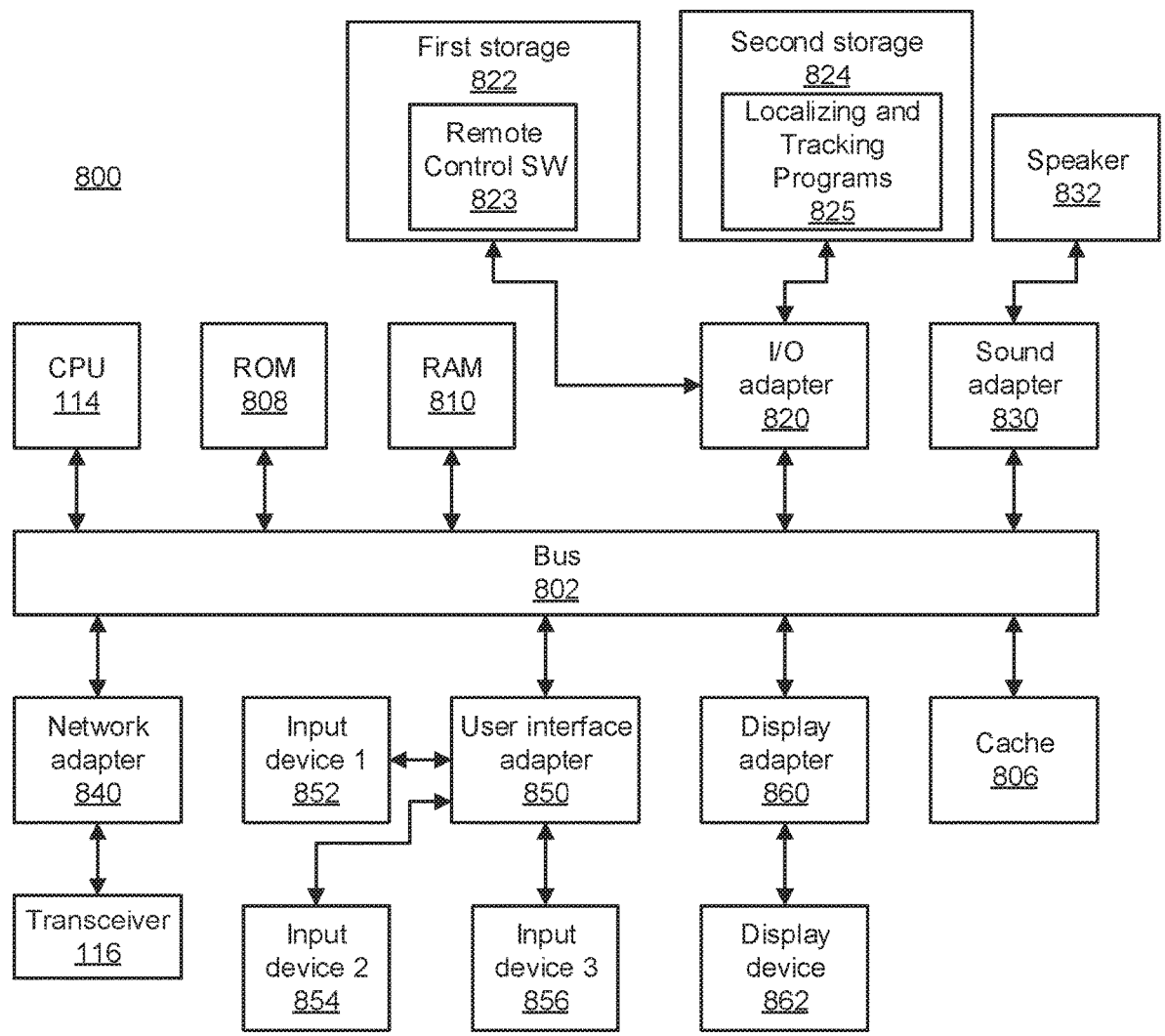
FIG. 8 is a block diagram illustrating a controller for a localizing and tracking system, in accordance with an embodiment of the present invention.

Referring to FIG. 8, an exemplary control system 800 is shown which may represent the ground station 150 (FIG. 1). The control system 800 includes at least one processor (CPU) 114 operatively coupled to other components via a system bus 802. A cache 806, a Read Only Memory (ROM) 808, a Random Access Memory (RAM) 810, an input/output (I/O) adapter 820, a sound adapter 830, a network adapter 840, a user interface adapter 850, and a display adapter 860, are operatively coupled to the system bus 802.

A first storage device 822 and a second storage device 824 are operatively coupled to system bus 802 by the I/O adapter 820. The storage devices 822 and 824 can be any of a disk storage device (e.g., a magnetic or optical disk storage device), a solid state magnetic device, and so forth. The storage devices 822 and 824 can be the same type of storage device or different types of storage devices. In one embodiment, the first storage device 822 or the second storage device 824 may include remote control software 823 to control the UAV. The remote control software 823 may be able to access the hardware necessary to get user inputs and output a control command to the remote control vehicle, like a joystick or an antenna. The remote control software 823 may be able to take a user input from an input device, like a joystick, and output a command to control the movement of the remote control vehicle in the direction intended by the movement of the joystick by the user.

In another embodiment, the first storage device 822 or the second storage device 824 may include map generating programs 825. The map generating programs 825 may be able to take GPS, telemetry, or path information to plot in a three-dimensional axis to form a map. The map generating programs 825 may take a produced map an overlay it on existing satellite or topographic maps to show the locations traveled gathering the data in relation to the physical world.

In yet another embodiment, the first storage device 822 or the second storage device 824 may include localizing and tracking programs. The localizing and tracking programs may localize and track mobile objects (for example, persons, responders, etc.) in real-time in (for example, large) indoor environments (such as, for example, a building, a structure, etc.) by leveraging a mobile virtual infrastructure provided by unmanned aerial vehicles (UAVs), with wireless technology for localization.

A speaker 832 may be operatively coupled to system bus 802 by the sound adapter 830. The speaker 832 may be used to give the user an auditory warning of low fuel or power. A transceiver 116 is operatively coupled to system bus 802 by network adapter 840. A display device 862 is operatively coupled to system bus 802 by display adapter 860.

A first user input device 852, a second user input device 854, and a third user input device 856 are operatively coupled to system bus 802 by user interface adapter 850. The user input devices 852, 854, and 856 can be any of a keyboard, a mouse, a keypad, a joystick, an image capture device, a motion sensing device, a microphone, a device incorporating the functionality of at least two of the preceding devices, and so forth. Of course, other types of input devices can also be used, while maintaining the spirit of the present principles. The user input devices 852, 854, and 856 can be the same type of user input device or different types of user input devices. The user input devices 852, 854, and 856 are used to input and output information to and from system 800.

Of course, the control system 800 may also include other elements (not shown), as readily contemplated by one of skill in the art, as well as omit certain elements. For example, various other input devices and/or output devices can be included in control system 800, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the control system 800 are readily contemplated by one of ordinary skill in the art given the teachings of the present principles provided herein.

FIG. 9 is a flow diagram illustrating a method 900 of localizing and tracking objects, in accordance with the present invention.

At block 910, localizing and tracking system 100 performs trajectory tracking of an object (for example, a node RFL CN 130 corresponding to personnel such as a first responder) using the UAV 102. Localizing and tracking system 100 analytically instruments a multi-lateration formulation to estimate the position and the velocity of the RFL CN 130. According to embodiments, localizing and tracking system 100 also adaptively varies a size and choice of a synthetic aperture to address RFL CNs 130 with non-uniform velocity.

At block 915, according to example embodiments, localizing and tracking system 100 determines an initial location of an RFL CN 130 based on multi-lateration.

At block 920, localizing and tracking system 100 determines a velocity vector associated with the RFL CN 130 based on multi-lateration, and detects a turning of the RFL CN 130 (at block 925). Localizing and tracking system 100 can determine the initial location initial location based on ultra-wideband signaling along with input from inertial sensors. Localizing and tracking system 100 also applies an adaptive aperture to determine a location of the RFL CN 130 based on the turning of the RFL CN 130 and the velocity vector (at block 930).

At block 935, localizing and tracking system 100 implements a multi-hop localization process in which RFL CNs 130 directly reachable by the UAV 102 are localized first. RFL CNs 130 dynamically estimate their hop status based on reachability from the UAV as well as overheard ranging messages from neighboring RFL CNs 130.

At block 940, localizing and tracking system 100 parallelizes the ranging measurements within each hop, and efficiently multiplexes ranging measurements between hops by allowing responders to access upstream messages, while also eliminating redundant message transmission.

At block 945, localizing and tracking system 100 performs reverse location lookup to estimate a location of the UAV 102.

Figure 10:
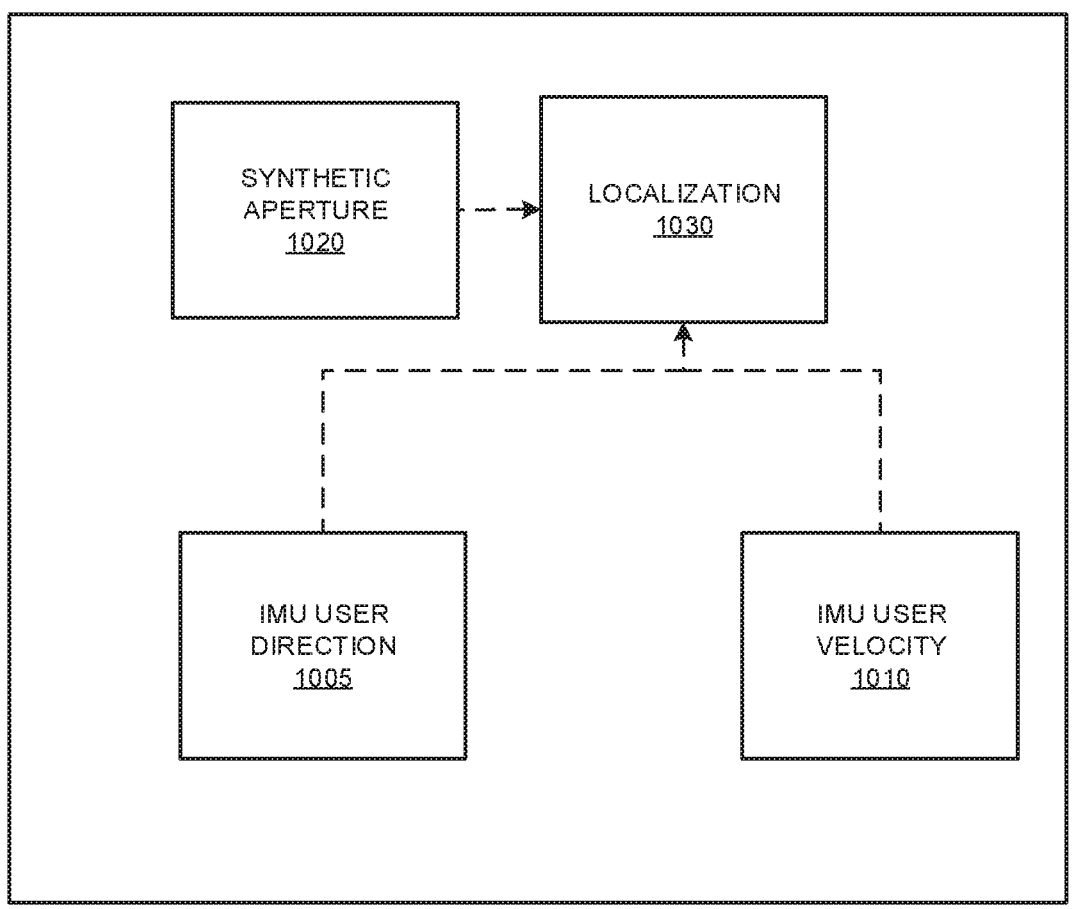
FIG. 10 is a block diagram illustrating a localization and tracking system with inertial sensors, in accordance with an embodiment of the present invention.

Referring to FIG. 10, a localizing and tracking system 1000 with inertial measurements is illustratively shown.

According to example embodiments, localizing and tracking system 1000 can incorporate and enhance the operations and components described with respect to localizing and tracking system 100 described herein above. The localizing and tracking system 1000 can receive and process measurements from inertial measurement units (IMUs) 320 deployed on users. The measurements can include IMU user direction 1005 and IMU user velocity 1010. The localizing and tracking system 1000 can incorporate these measurements with a synthetic aperture 1020 for localization 1030 (for example, implemented by location solver 220).

The temporal aperture formed by the UAV 102 during its flight comprises of location-stamped range information that is used to localize indoor RFL CNs 130 (for example, UWB nodes), specifically the ones in the first hop. Also note that the second hop nodes are localized using multiple first hop nodes (at least three) where the latter form a spatial aperture. However, in situations when the first hop nodes (for example, nodes 130-1 in FIG. 6) are not reachable from the UAV 102 or there are not enough first hop nodes to localize the second hop nodes, inertial sensors, such as IMUs 320, can be used.

The inertial measurement units (IMUs) 320 provide information from accelerometer, compass and gyroscope that can be used to compute relative displacement using dead reckoning algorithms. Thus, for a single RFL CN 130 (for example, UWB node) equipped with inertial sensors, localizing and tracking system 1000 can estimate its trajectory which in turn can be used as a synthetic aperture to localize other UWB nodes. However, in this case, since the absolute locations of the nodes are not available, the RFL CNs 130 (for example, UWB nodes) will be localized relative to other nodes.

Figure 11:
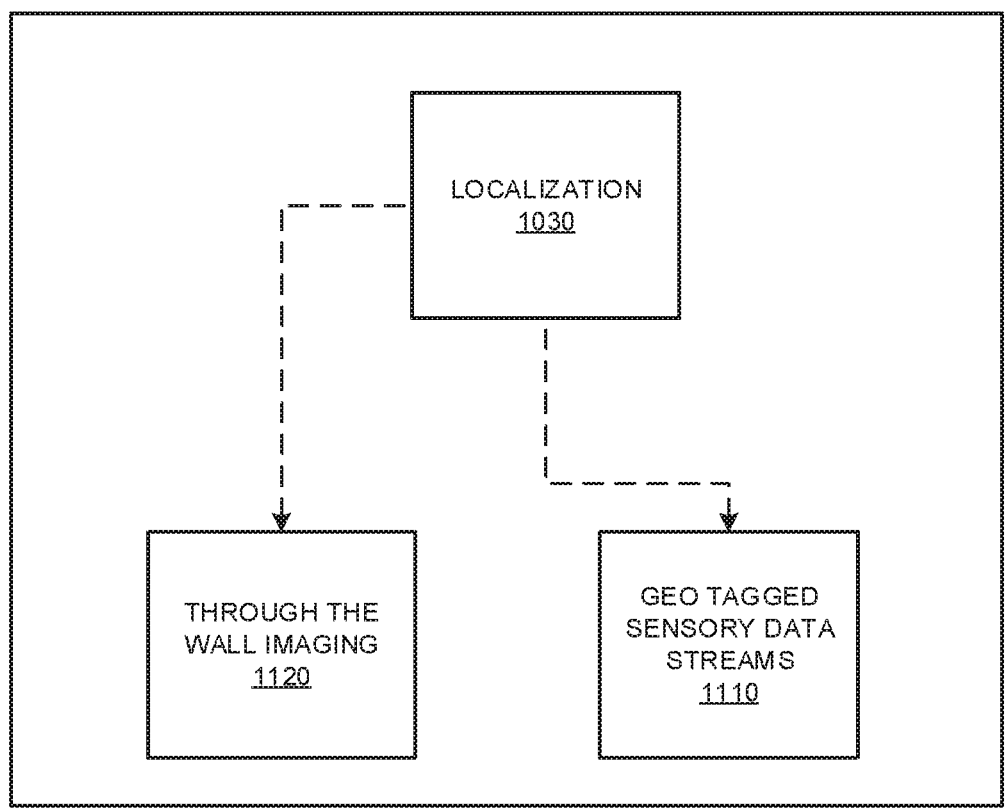
FIG. 11 is a block diagram illustrating an indoor localization system, in accordance with an embodiment of the present invention.

Referring to FIG. 11, an indoor localization system 1100 is illustratively shown.

Indoor localization system 1100 (similarly as described with respect to systems 100, and 1000) enables indoor localization without any reliance on pre-deployed indoor infrastructure. Indoor localization system 1100 can enable applications geared towards but not limited to first responders. Indoor localization system 1100 can also enable applications for academic, recreational and public safety implementation.

According to an example embodiment, indoor localization system 1100 can support geo-tagged sensory data streams 1110. Indoor localization system 1100 can transmit geo-tagged data streams in real-time from an indoor location. For instance, the streams can comprise of photos, videos or other sensory data relevant to a given location. The streams can also include data relevant to the localized node, e.g., biometric data from a first responder or thermal data from a robot, etc.

Indoor localization system 1100 can implement, based on localization, delivery of geo-tagged data including geo-tagged imagery and geo-tagged sensory data.

According to an example embodiment, indoor localization system 1100 can support through-the-wall imaging 1120. Localized nodes can be equipped with RF imaging capabilities (for example, RFI 330 in FIG. 3) that the nodes can use to image objects that are visually occluded. The synthetic aperture formed by the mobility of the localized node emulates a larger antenna array acting in a similar manner as a radar's aperture. Identification of humans in this way can be used to provide information to help first responders to plan, prioritize and execute their search and rescue operations.

FIG. 12 is a flow diagram illustrating a method 1200 of localizing and tracking objects incorporating inertial sensor measurements, in accordance with the present invention.

At block 1210, localizing and tracking system 1000 determines an initial location of nodes in a multi-hop network (such as described with respect to FIG. 6) based on multi-lateration from a UAV 102.

At block 1220, localizing and tracking system 1000 applies an adaptive aperture to address a non-uniform velocity of a node in the multi-hop network based on the turning of the node and a velocity vector.

At block 1230, localizing and tracking system 1000 determines whether localization can be implemented using first hop nodes. For example, localizing and tracking system 1000 can determines whether a first hop node is not reachable from the UAV 102 or whether there are not enough first hop nodes to localize.

At block 1240, in response to a determination that localization cannot be implemented using the first hop nodes (1220—NO), localizing and tracking system 100 uses inertial sensors from the second hop nodes to localize the RFL CN 130. The IMU 320 includes a compass, used to indicate the direction of motion which in turn helps to resolve the velocity vector more accurately. While the personnel is in motion, the compass reported direction correlates highly to the direction of the personnel's motion. Hence the direction of the velocity vector can be directly inferred from the compass. Note, that the estimation of the velocity vector involves both, estimation of the magnitude of the velocity (speed) as well as the direction. The inferred estimate from the compass can be directly plugged in to the solver to make the estimate much better that compared to without a compass.

At block 1250, localizing and tracking system 100, in response to a determination that localization can be implemented using the first hop nodes (122—YES), performs localization based on the first hop nodes.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A method for localizing and tracking a mobile object inside a structure, comprising:
    creating a synthetic aperture of anchor points from which an unmanned aerial vehicle (UAV) generates range estimates to all reachable ultra-wideband (UWB) nodes from a plurality of reference UWB nodes positioned inside the structure;
    determining an initial location and velocity of the UWB node connected to the mobile object in a multi-hop network based on multi-lateration from the UAV, the range estimates to the reachable UWB nodes, and inertial sensors connected to the UWB node configured to detect and communicate an initial velocity of the mobile object to the UAV, wherein the UAV includes a UAV UWB node in communication with the UWB node of the mobile object and the plurality of reference UWB nodes;
    determining a velocity vector associated with the UWB node of the mobile object based on the multi-lateration from the UAV and the inertial sensors connected to the UWB node;
    detecting a turning of the UWB node of the mobile object by identification of a non-uniform velocity of the UWB node of the mobile object;
    applying, by processor device, an adaptive aperture to address the non-uniform velocity of the UWB node of the mobile object based on a turning of the UWB node and the velocity vector associated with the UWB node of the mobile object to improve localization accuracy by removing all history and restarting estimating location of the UWB node on the mobile object when the turning of the UWB node of the mobile object is detected;
    determining whether localization for the UWB node of the mobile object can be implemented using first hop nodes in the multi-hop network; and
    in response to a determination that localization cannot be implemented using the first hop nodes, accessing inertial sensor measurements associated with the UWB node of the mobile object, and integrating the inertial sensor measurements with the adaptive aperture to improve the localization accuracy.

2. The method as recited in claim 1, further comprising implementing, based on localization, delivery of geo-tagged data including at least one of data relevant to a location and data relevant to the UWB node.

3. The method as recited in claim 1, further comprising implementing, based on localization, delivery of geo-tagged data including at least one of geo-tagged imagery and geo-tagged sensory data.

4. The method as recited in claim 1, wherein integrating the inertial sensor measurements with the adaptive aperture further comprises resolving, based on a direction of motion from the inertial sensor measurements, the velocity vector associated with the UWB node.

5. The method as recited in claim 1, further comprising determining an absolute location fix of the UAV based on at least one radio frequency beacon positioned on an associated ground vehicle.

6. The method as recited in claim 1, further comprising utilizing a plurality of UAVs by deploying each of the plurality of UAVs to a different section of a building to provide wider coverage.

7. The method as recited in claim 1, further comprising applying a multi-hop localization process based on a reachability of the UWB node from the UAV.

8. The method as recited in claim 7, wherein applying the multi-hop localization process further comprises dynamically estimating, by the UWB node, a hop status of the UWB node based on at least one overheard ranging message from at least one neighboring UWB node.

9. The method of claim 7, wherein the multi-hop network includes UWB nodes in a particular hop and UWB nodes in a subsequent hop, and the method further comprises implementing the UWB nodes in the particular hop to serve as beacons to localize the UWB nodes in the subsequent hop.

10. The method as recited in claim 7, further comprising: parallelizing ranging measurements within each hop; and eliminating redundant message transmissions.

11. The method as recited in claim 1, further comprising collecting ranging information from the UWB node by the UAV.

12. A computer system for localizing and tracking a mobile object inside a structure, comprising:
a memory device including program code stored thereon;
a processor device, operatively coupled to the memory device, and configured to run the program code stored on the memory device to:
create a synthetic aperture of anchor points from which an unmanned aerial vehicle (UAV) generates range estimates to all reachable ultra-wideband (UWB) nodes from a plurality of reference UWB nodes positioned inside the structure
determine an initial location and velocity of the UWB node in a multi-hop network based on multi-lateration from the UAV, the range estimates to the reachable UWB nodes, and inertial sensors connected to the UWB node configured to detect and communicate an initial velocity of the mobile object to the UAV, wherein the UAV includes a UAV UWB node in communication with the UWB node of the mobile object and the plurality of reference UWB nodes;
determine a velocity vector associated with the UWB node of the mobile object based on the multi-lateration from the UAV and the inertial sensors connected to the UWB node;
detect a turning of the UWB node of the mobile object by identification of a non-uniform velocity of the UWB node of the mobile object;
apply an adaptive aperture to address the non-uniform velocity of the UWB node of the mobile object based on a turning of the UWB node and the velocity vector associated with the UWB node of the mobile object to improve localization accuracy by removing all history and restarting estimating location of the UWB node on the mobile object when the turning of the UWB node of the mobile object is detected;
determine whether localization for the UWB node of the mobile object can be implemented using first hop nodes in the multi-hop network; and in response to a determination that localization cannot be implemented using the first hop nodes, access inertial sensor measurements associated with the UWB node of the mobile object, and integrate the inertial sensor measurements with the adaptive aperture to improve the localization accuracy.

13. The computer system as recited in claim 12, wherein the processor device is further configured to run the program code to implement, based on localization, delivery of geo-tagged data including at least one of data relevant to a location and data relevant to the UWB node.

14. The computer system as recited in claim 12, wherein the processor device is further configured to run the program code to provide a visualization on an associated display of a position of the object.

15. The computer system as recited in claim 12, wherein the processor device is further configured to run the program code to implement, based on localization, delivery of geo-tagged data including at least one of geo-tagged imagery and geo-tagged sensory data.

16. The computer system as recited in claim 12, wherein the processor device is further configured to run the program code to determine an absolute location fix of the UAV based on at least one radio frequency beacon positioned on an associated ground vehicle.

17. The computer system as recited in claim 12, further comprising utilizing a plurality of UAVs by deploying each of the plurality of UAVs to a different section of a building to provide wider coverage.

18. The computer system as recited in claim 12, wherein the processor device is further configured to run the program code to apply a multi-hop localization process based on a reachability of the UWB node from the UAV.

19. The computer system as recited in claim 18, wherein, when applying the multi-hop localization process, the processor device is further configured to run the program code to dynamically estimate, by the UWB node, a hop status of the UWB node based on at least one overheard ranging message from at least one neighboring UWB node.

20. A computer program product for localizing and tracking a mobile object inside a structure, the computer program product comprising a non-transitory computer readable storage medium having program instructions embodied therewith, the program instructions executable by a computing device to cause the computing device to perform the method comprising:
creating a synthetic aperture of anchor points from which an unmanned aerial vehicle (UAV) generates range estimates to all reachable ultra-wideband (UWB) nodes from a plurality of reference UWB nodes positioned inside the structure;
determining an initial location and velocity of the UWB node connected to the mobile object in a multi-hop network based on multi-lateration from the UAV, the range estimates to the reachable UWB nodes, and inertial sensors connected to the UWB node configured to detect and communicate an initial velocity of the mobile object to the UAV, wherein the UAV includes a UAV UWB node in communication with the UWB node of the mobile object and the plurality of reference UWB nodes;
determining a velocity vector associated with the UWB node of the mobile object based on the multi-lateration from the UAV and the inertial sensors connected to the UWB node;

detecting a turning of the UWB node of the mobile object by identification of a non-uniform velocity of the UWB node of the mobile object;

applying, by processor device, an adaptive aperture to address the non-uniform velocity of the UWB node of the mobile object based on a turning of the UWB node and the velocity vector associated with the UWB node of the mobile object to improve localization accuracy by removing all history and restarting estimating location of the UWB node on the mobile object when the turning of the UWB node of the mobile object is detected;

determining whether localization for the UWB node of the mobile object can be implemented using first hop nodes in the multi-hop network; and in response to a determination that localization cannot be implemented using the first hop nodes, accessing inertial sensor measurements associated with the UWB node of the mobile object, and integrating the inertial sensor measurements with the adaptive aperture to improve the localization accuracy.

* * * * *